April 25, 1950  F. K. GOLDHARD  2,505,540
INJECTION MOLDING APPARATUS
Filed Feb. 4, 1946  2 Sheets-Sheet 1

INVENTOR
FRANZ K. GOLDHARD
BY Young, Emery & Thompson
Attys.

Patented Apr. 25, 1950

2,505,540

UNITED STATES PATENT OFFICE 2,505,540

INJECTION MOLDING APPARATUS

Franz Karl Goldhard, London, England

Application February 4, 1946, Serial No. 645,279
In Great Britain February 15, 1945

13 Claims. (Cl. 18—30)

The present invention relates to the moulding of plastic materials.

In moulding plastic materials by the conventional methods, usually known as injection jet or extrusion moulding, where high pressure is used in the moulding process, the pressure is applied to the material in an injection chamber. In the case of materials which are plasticised by heat, the material is fed to the chamber in a substantially granular state and is heated up gradually in the same chamber and then discharged through a nozzle into a tapered bore leading to the mould runners and cavities or through an extrusion nozzle.

For accelerating the even heating of the material in the injection chamber a shaped insert is usually employed which causes the material to spread into a thin layer around the heated walls of the chamber.

These known methods of pressure moulding necessitate the application of very high operating pressures mainly due to the fact that the resistance of the insert and the nozzle to the passage of the material in its not completely plasticised state, is extremely high. Also the speed of the moulding process is limited by the high resistance thus set up so that the material commences to set in the mould before the latter is completely filled which also increases the degree of pressure required to bring the material to its final moulded form. The high moulding pressure tends to open the closed mould and therefore necessitates the employment of a heavy, high pressure mould clamping or locking device and also involves massively built moulding apparatus generally, and comparatively high operating costs.

The object of the invention is to provide a modified and improved apparatus for moulding plastic materials under pressure which avoids the need for applying the ultimate moulding pressure to the mass of moulding material while in the unformed state.

It has been proposed to apply pressure to the moulding material in a plurality of stages in which the final stage serves to inject the moulding material into the cavity of the mould.

According to one feature of the invention pressure is applied to the moulding material in a plurality of stages, at one stage moulding material is fed into the cavity of the mould through a number of passages in series until the mould cavity is substantially filled with material while at a subsequent stage the supply of material is cut off and additional pressure applied at an intermediate passage to cause further material to be pressed into the cavity of the mould.

According to another feature of the invention apparatus for moulding plastic material comprises a structure having a plurality of passages leading into each other successively, means for feeding moulding material under pressure through said passages to a mould, means for cutting off the supply of moulding material when the pressure is such as to substantially fill the cavity of a mould and means for applying further pressure in one of said passages to inject further material into the mould.

More particularly where the molding is effected in two or three pressure stages, according to the invention, the material is mainly plasticised in the first pressure stage and in passing through the following stages is additionally heated.

The bulk of the material, i. e. more than 50% (preferably over 65%) is filled into the mould cavities by the first stage pressure, or in the initial stages. On encountering a certain resistance from the material the first pressure stage or initial stages cut out and penultimate pressure is applied by which the rest of the material necessary to fill the mould is forced therein. In the next stage, which follows, when the material offers a certain resistance, the final pressure is applied by which any remaining minute branches of the mould cavities are completely filled and the small amount of material supplied necessary to make up for volume loss due to shrinkage during the hardening process.

In order to achieve the desired performance and efficiency in each pressure stage, the space in which the material is subjected to a lower pressure is always closed, whilst or before applying the pressure of a higher pressure stage.

The last pressure stage can be performed in an extrusion nozzle from which the material is discharged into the mould through a tapered sprue channel, but preferably this operation is performed in a space directly connected to the runners of the mould without the interposition of a nozzle or tapered sprue channel. This space is actually part of the mould cavity and any material left in it after the final pressure application hardens, together with the moulded article, and is ejected with it after the moulding operation is completed.

Preferably, the means for applying the pressure in the last pressure stage is also used for ejecting the hardened residue from the space in which the last pressure stage is applied after the mould has been opened. In order to keep this hardened residue, which is more or less waste, to a minimum, the whole space provided for the last pressure stage is made as small as possible, i. e. in each particular case only large enough to contain a sufficient volume of material to ensure complete filling of the remaining parts of the mould cavities and to replace shrinkage losses. The main difficulty in achieving this desired minimum content of the final pressure space is the fact that there are certain inevitable variations in the feeding and mould filling process due to differences in the density of the material, inaccuracy of feed regulation and the like which have the effect that, in practice, the end positions of the pressure plungers will not be the same in a series of moulding shots. If all these variations, which may be considerable, had to be taken into account, the capacity of the space provided for the last pressure stage, and therefore the waste of material would be great.

To overcome this difficulty, two different methods can be applied according to the invention. In the first method, the final and preceding pressure stages are operated independently so that the space provided for the final pressure stage is always the same while the space left in the preceding stage, which may vary from shot to shot, is sealed off.

In the second method, a certain interval is provided between the operation of the final pressure stage and the cutout of the preceding stage during which the means for operating the final pressure stage is already in motion but the space provided for the preceding stage not yet sealed off and capable of a certain expansion so that displaced material can enter this space without the building up of any pressure higher than the pressure limit of the preceding stage.

The particular advantage of this multi-stage method of pressure moulding after the cavity of the mould is substantially filled is the fact that the means for exerting higher pressure on the material can be of comparatively small pressure area, as the bulk of the material is supplied to the mould in the first pressure stage or initial pressure stages, preferably by a continuous conveying means. Furthermore, in comparison to other known methods, the total pressure required is low as the final and usually highest pressure is applied to the already plasticised material and over a small area only, whereas, in the known methods, the power supply must be dimensioned for the maximum pressure on the whole area of the injection cylinder.

In order that the nature of the invention may be fully understood constructional forms of pressure moulding apparatus for carrying the process of the invention into effect will now be described with reference to the accompanying diagrammatic drawings in which.

Figure 1:
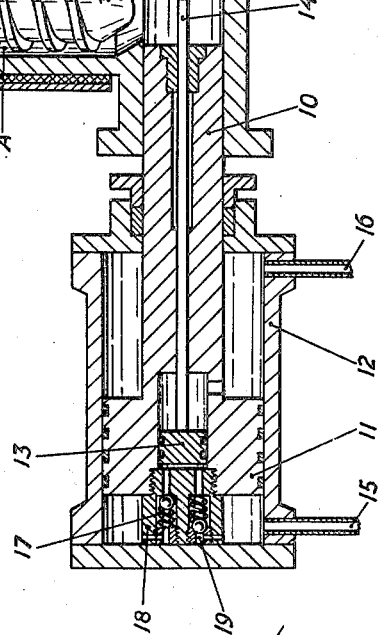
Fig. 1 shows a sectional elevation of a moulding apparatus embodying three pressure stages for moulding thermoplastic material.

Referring to Fig. 1, a reservoir or hopper 1 is provided from which the granular material is fed by gravity or otherwise into the heating chamber A within which the first phase of the process is applied. 2 indicates electric heating elements; 3 the bulb of the thermostat controlling the temperature of the heating cylinder; and 4 a conveyor screw, driven by a geared variable speed motor 5. The drive shaft 6 of the conveyor screw 4 is axially movable to operate a limit switch 8 by means of a cam 7. The material is forced by the screw from the heating chamber A, in which it is plasticised, into the injection cylinder B where further heat may be applied and into the mould through the passage C. As soon as the resistance against the movement of the screw increases beyond a certain limit, the feeding device is cut out by the back pressure e. g. by lifting the screw axially against the pressure of the spring 9, and operating limit switch 8 which stops the motor 5. Alternatively, the motor could also be stopped by other means, e. g. by an overload trip, by a timing device or by a hand switch.

The second pressure stage in which the rest of the plasticised material is filled into the mould cavities is effected, e. g. by means of a plunger 10 connected with a hydraulically operated double acting piston 11 moving in a cylinder 12. As the plunger 10 moves forward it closes the entrance port from the chamber A to the chamber B so that the total pressure of the plunger is available for filling the material into the mould at a higher pressure than that applied in the preceding stage.

A second, smaller hydraulic piston 13 is arranged within a concentric bore of the piston 11 and is connected with a plunger 14 which passes through an axial passage in the plunger 10. The ratio of the area of the piston 11 to that of the plunger 10 is smaller than that of the area of piston 13 to the area of the plunger 14, so that the specific pressure exerted by the latter is greater than that of the larger plunger 10, if the same hydraulic pressure is applied to both pistons.

Both pistons are preferably operated by high pressure oil, alternatively supplied and exhausted through the pipelines 15 and 16 by means of a pump and control system, not shown in the drawing.

As soon as the pressure oil is supplied through pipeline 15 and exhausted through pipeline 16, the piston 11 starts moving forward, carrying piston 13 with it, until equilibrium is reached between the oil pressure on the piston area and the resistance of the material in chamber B. Then piston 11 stops and pressure oil is admitted through a spring loaded check valve 19 in a screwed plug 18 to the left hand side of piston 13 pressing the latter forward. The material displaced by plunger 14 pushes plunger 10 slightly backward until the plunger 14 enters the bore C, connecting chamber B with the mould cavity 20. Now the full pressure of the plunger 14 is applied to the material in the mould ensuring that all parts of the mould cavities are completely filled and shrinkage losses replaced.

During this whole process the two mould halves 21 and 22 must be clamped together in order to prevent their being forced open by the pressure of the plastic material. This pressure which of course is much less than the applied pressure due to the resistance offered is also considerably smaller than that in the usual injection moulding machines, so that comparatively simple and light clamping devices can be employed, or, with clamping devices of the usual strength, much larger moulds can be locked together to withstand the injection pressure.

As soon as the material is hardened in the mould (which for the purpose of speeding up this process may be water-cooled in the usual way) the mould clamps are unlocked and the mould opened by a screw or any other mechanical or hydraulic means, which are not shown as they do not constitute part of the invention. As the mould opens, the hardened material remaining in the cylindrical space C is pushed out by the plunger 14 and the finished moulding ejected from the moving mould plate 21 in the usual way by means of ejector pins 23, ejector plate 24 and fixed stops 25.

Figure 2:
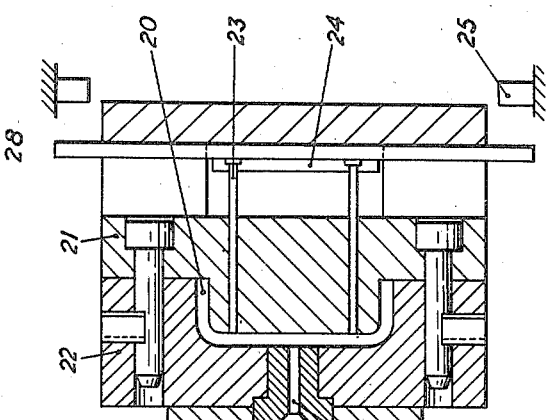
Fig. 2 is a sectional detail of part of a mould clamping arrangement.

When the moulding process is completed, the plungers 10 and 14 are retracted by changing over the pressure oil supply to pipeline 16 and the exhaust connection to pipeline 15. A second check valve 17 is provided in the same plug 18 to allow the oil to escape in order to permit the return movement of piston 13. The clamping arrangement will generally have to be designed according to the requirements of the particular mould and will be preferably part of the mould. An example of a suitable clamping arrangement as shown diagrammatically in Figs. 1 and 2 comprises a number of dowels 26 with slots 27 engaged by locking bars 28 provided with wedge faces and moved longitudinally by any suitable mechanism not shown.

A particular advantage of the method described above is the high capacity of apparatus working according to the method of the invention, due to the fact that the amount of material for one shot is not limited by the space available in the injection cylinder, since the feeding means of the first pressure stage, e. g. the conveyor screw is capable of delivering material through the injection cylinder into the mould continuously as long as the flow resistance is low. Only as the latter rises, the feeding is taken over by the second stage injection plunger and after a further rise of the resistance by the third stage pressure plunger, the cross sectional area of the latter being only a fraction of the cross sectional area of the space in which the plunger operates.

In order to accommodate moulds of different sizes, the whole pressure mechanism can be made vertically adjustable by means of V-slides, adjusting screws or any other convenient way.

While Fig. 1 shows as an example, an arrangement of the heating cylinder in a vertical position and at right angles to the injection cylinder, it is understood that the invention is not limited to this arrangement but any other arrangement, e. g. with a horizontal heating cylinder or a heating cylinder at any convenient angle to the injection chamber may be used for carrying the method of this invention into effect.

Figure 3:
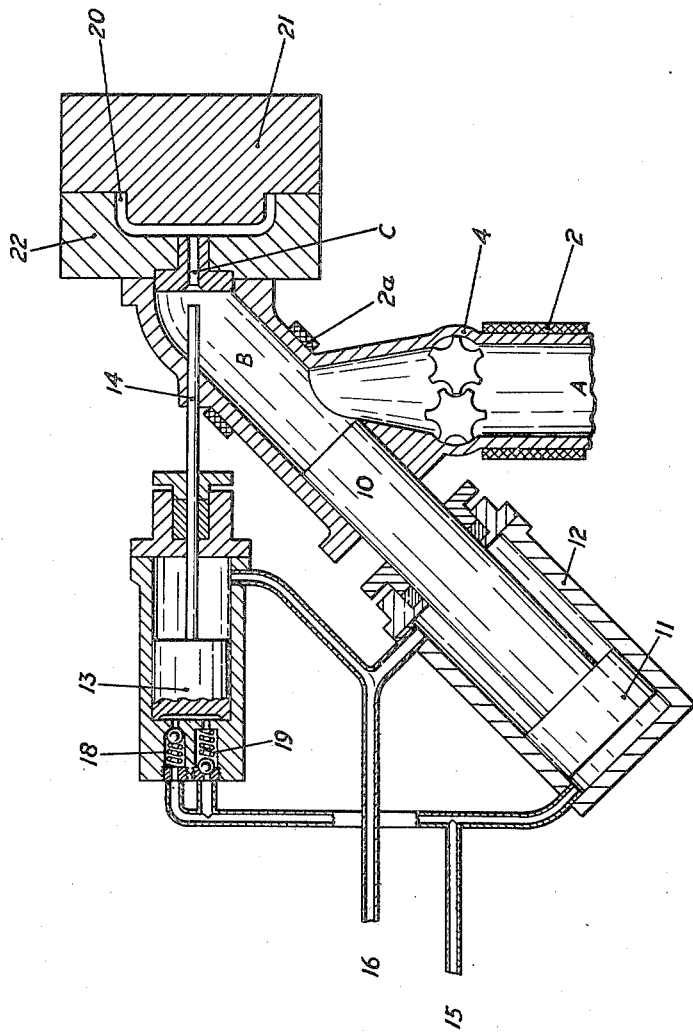
Fig. 3 is a sectional elevation of a modified arrangement of moulding apparatus embodying three pressure stages for moulding thermoplastic material.

In the modified arrangement of moulding apparatus shown in Fig. 3, corresponding parts are denoted by the same references as in Fig. 1. In this modification, the plungers 10 and 14 of the second and third pressure stages are independent; the plunger 14 always starts from the same point, independent of the end position of the plunger 10, and closes the space B shortly after starting. Thus, a practically constant stroke of the plunger 14, and a minimum of waste material is ensured. In this example a modified feeeding device 4 is shown, similar to a gear pump, but with a certain clearance between the gear teeth to diminish friction of the plastic material. This device can for example be driven by a geared motor (not shown) with a suitable overload trip, cutting the motor out when a certain resistance is reached. As a further modification an additional heating device 2a is shown in Fig. 3 for completing the plasticising process in the second pressure stage.

In each of the above described embodiments of moulding apparatus means such as electrically or manually controlled valves may be provided for sealing off one pressure stage space from the preceding space before the pressure is applied to material contained in the sealed off space.

The carrying out of the invention is not limited to the constructional forms of moulding apparatus above described while the method of the invention is not restricted to the moulding of thermoplastic or thermosetting materials since obviously the multi-stage pressure method claimed in the appended claims can be applied with advantage to the pressure moulding of self setting materials and for this purpose modified forms of apparatus not necessarily embodying means for heating the material could be employed.

I claim:

1. In a machine for moulding plastic material the combination of a mould cavity, a reservoir for moulding material, a structure having a plurality of passageways leading serially from said reservoir to said mould cavity, a first feeding means associated with one of said passageways near to said reservoir for forcing moulding material under pressure from said passageway and through the remaining serial passageways into said mould cavity, pressure responsive means operable by the pressure set up in the moulding material by said first feeding means and means for cutting-off connection between said first feeding means and said mould cavity and for applying further pressure to the moulding material in another of said passageways nearer to said mould cavity for forcing further material into said mould cavity, the operation of said last-mentioned means being initiated by said pressure-responsive means upon the exertion of a predetermined pressure by said first feeding means.

2. A machine as claimed in claim 1 in which said connection cut-off and further pressure-applying means comprises a plunger movable in a chamber forming one of said passageways.

3. A machine as claimed in claim 1 in which said first feeding means comprises continuous mechanical feeding device operating within a chamber forming one of said passageways, said pressure-responsive means comprising a device which is responsive to the progressively increased resistance offered by the material being moved by said continuous feeding device.

4. A machine as claimed in claim 1 in which said first feeding means comprises continuous mechanical feeding device operating within a chamber forming one of said passageways, said pressure-responsive means comprising a device which is responsive to the progressively increased resistance offered by the material being moved by said continuous feeding device, and in which said continuous feeding device comprises a rotary screw conveyor.

5. A machine as claimed in claim 1 comprising means for plasticizing the moulding material by heating while passing through said passageways.

6. A machine as claimed in claim 1 which includes further means for cutting-off connection between said further pressure-applying means and said mould cavity and for applying still higher pressure to the moulding material in another of said passageway still nearer to said mould cavity.

7. A machine as claimed in claim 1 which includes further means for cutting-off connection between said further pressure-applying means and said mould cavity and for applying still higher pressure to the moulding material in another of said passageways still nearer to said mould cavity, and in which each of said cutting-off and pressure applying means consist of plungers movable within their associated passageways, said plungers being actuated by fluid pressure cylinder and piston devices from a common source of fluid pressure, the different pressures of the two means being obtained by variation of the respective ratios of piston area to plunger area.

8. A machine as claimed in claim 1 in which said connection cut-off and further pressure applying means comprises a reciprocatory plunger movable into and out of a passage which leads directly to a runner for said mould cavity, the stroke of said plunger being sufficient to eject all moulding material from said passage.

9. A machine as claimed in claim 1 in which said connection cut-off and further pressure applying means comprises a first plunger movable in the associated passageway and which also includes a second plunger movable within another passageway still nearer to said mould cavity, said second plunger, during its travel covering and sealing a port leading to a passageway associated with said first plunger.

10. A machine as claimed in claim 1 in which said connection cut-off and further pressure applying means comprises a first plunger movable in the associated passageway and which also includes a second plunger movable within another passageway still nearer to said mould cavity, said second plunger, during its travel covering and sealing a port leading to a passageway associated with said first plunger, the first plunger operating in timed relationship to the operative displacement of the second plunger.

11. A machine as claimed in claim 1 in which said connection cut-off and further pressure applying means comprises a first plunger movable in the associated passageway and which also includes a second plunger movable within another passageway still nearer to said mould cavity, said second plunger, during its travel covering and sealing a port leading to a passageway associated with said first plunger, the second plunger being carried by the first plunger to move bodily therewith when the first plunger advances and subsequently to perform its operative movement separately from the movement of the ram.

12. A machine as claimed in claim 1 in which said connection cut-off and further pressure applying means comprises a first plunger movable in the associated passageway and which also includes a second plunger movable within another passageway still nearer to said mould cavity, said second plunger, during its travel covering and sealing a port leading to a passageway associated with said first plunger, the second plunger being carried by the first plunger to move bodily therewith when the first plunger advances and subsequently to perform its operative movement separately from the movement of the ram, and the relative movement between the first and second plungers being controlled by a device which is responsive to the progressively increased resistance offered by the material to the pressure applied thereto.

13. A machine as claimed in claim 1 in which said connection cut-off and further pressure applying means comprises a first plunger movable in the associated passageway and which also includes a second plunger movable within another passageway still nearer to said mould cavity, said second plunger, during its travel covering and sealing a port leading to a passageway associated with said first plunger, the first plunger being operated under pressure and is adapted to yield as the second plunger advances to maintain the pressure substantially constant until the passage in which the first plunger operates is sealed off.

FRANZ KARL GOLDHARD.

REFERENCES CITED

The following references are of record in the file of this patent:

UNITED STATES PATENTS

| Number | Name | Date |
|---|---|---|
| 2,105,586 | Daesen | Jan. 18, 1938 |
| 2,136,383 | Huck | Nov. 15, 1938 |
| 2,181,157 | Smith | Nov. 28, 1939 |
| 2,182,400 | Husted | Dec. 5, 1939 |
| 2,253,822 | Sundback | Aug. 26, 1941 |
| 2,359,839 | Goessling | Oct. 10, 1944 |
| 2,359,840 | Goessling | Oct. 10, 1944 |

FOREIGN PATENTS

| Number | Country | Date |
|---|---|---|
| 501,277 | Great Britain | Aug. 22, 1938 |